US012602262B2

(12) United States Patent
Shveidel et al.

(10) Patent No.: US 12,602,262 B2
(45) Date of Patent: Apr. 14, 2026

(54) SHARED RESOURCE POOL WITH PERIODIC REBALANCING IN A MULTI-CORE SYSTEM

(71) Applicant: Dell Products L.P., Round Rock, TX (US)

(72) Inventors: Vladimir Shveidel, Pardes-Hana (IL); Jenny Derzhavetz, Raanana (IL)

(73) Assignee: Dell Products L.P., Round Rock, TX (US)

( * ) Notice: Subject to any disclaimer, the term of this patent is extended or adjusted under 35 U.S.C. 154(b) by 441 days.

(21) Appl. No.: 18/367,042

(22) Filed: Sep. 12, 2023

(65) Prior Publication Data

US 2025/0086028 A1 Mar. 13, 2025

(51) Int. Cl.
*G06F 9/50* (2006.01)

(52) U.S. Cl.
CPC ............ *G06F 9/5077* (2013.01); *G06F 9/505* (2013.01); *G06F 9/5083* (2013.01); *G06F 2209/5011* (2013.01)

(58) Field of Classification Search
None
See application file for complete search history.

(56) References Cited

U.S. PATENT DOCUMENTS

| | | | | | |
|---|---|---|---|---|---|
| 6,078,943 | A * | 6/2000 | Yu | ........................... | G06F 9/505 |
| | | | | | 718/105 |
| 7,620,953 | B1 * | 11/2009 | Tene | ..................... | G06F 9/5077 |
| | | | | | 718/1 |
| 7,669,202 | B1 * | 2/2010 | Tene | ....................... | G06F 9/547 |
| | | | | | 718/1 |
| 8,302,102 | B2 * | 10/2012 | Anand | ................... | G06F 9/5077 |
| | | | | | 718/104 |
| 9,104,496 | B2 * | 8/2015 | Jacobs | ................... | G06F 9/4887 |
| 9,569,277 | B1 * | 2/2017 | Cropper | ............... | G06F 9/5011 |
| 9,740,762 | B2 * | 8/2017 | Horowitz | .............. | G06F 16/278 |
| 9,805,108 | B2 * | 10/2017 | Merriman | ............. | G06F 16/278 |
| 9,826,041 | B1 * | 11/2017 | Dhoolam | ............ | H04L 67/1095 |
| 10,608,954 | B2 * | 3/2020 | Gosselin-Harris | .... | H04L 47/782 |
| 10,673,981 | B2 * | 6/2020 | Sahay | ................. | G06F 9/45558 |
| 11,327,812 | B1 * | 5/2022 | Shveidel | .............. | G06F 3/0659 |
| 11,595,469 | B2 * | 2/2023 | Ferraro | ................. | G06F 9/5066 |
| 11,789,773 | B2 * | 10/2023 | Lee | ........................ | G06F 9/5033 |
| | | | | | 718/100 |
| 2010/0145668 | A1 * | 6/2010 | Fisher | ................... | G06T 17/205 |
| | | | | | 703/6 |
| 2013/0326185 | A1 | 12/2013 | Loh et al. | | |
| 2015/0331465 | A1 | 11/2015 | Slik | | |
| 2018/0143862 | A1 * | 5/2018 | Saeidi | ..................... | G06F 1/206 |
| 2023/0267456 | A1 | 8/2023 | Garner et al. | | |

* cited by examiner

*Primary Examiner* — Van H Nguyen
(74) *Attorney, Agent, or Firm* — BainwoodHuang

(57) ABSTRACT

A percentage of the resource units contained in a shared resource pool of a data storage system is loaded into a global partition, and the resource units not loaded into the global partition are loaded into per-core partitions. Each per-core partition corresponds to one of multiple processor cores in the data storage system. Resource units are allocated from each one of the per-core partitions only to a work flow executing on the corresponding processor core. The number of available resource units in each one of the per-core partitions is periodically rebalanced by moving resource units between the global partition and that per-core partition.

17 Claims, 6 Drawing Sheets

INITIALIZATION FLOW 200

202   CALCULATE TOTAL POOL SIZE SUFFICIENT TO SERVE MAXIMUM EXPECTED WORKLOAD PLUS OVERPROVISION

204   LOAD GLOBAL PARTITION WITH A PERCENTAGE OF THE TOTAL POOL SIZE

206   LOAD THE PER-CORE PARTITIONs WITH THE REMAINING RESOURCE UNITS

POOL OPERATION PROCESSING FLOW 300
(FOR ALLOCATE RESOURCE UNIT AND
FREE RESOURCE UNIT OPERATIONS)

302 PERFORM POOL OPERATION (I.E. ALLOCATE RESOURCE UNIT OR FREE RESOURCE UNIT OPERATION) USING ONLY THE PER-CORE PARTITION (THE "LOCAL PARTITION")

304 IF LOCAL PARTITION SIZE INSUFFICIENT FOR AN ALLOCATE RESOURCE UNIT REQUEST, I) TRIGGER EXECUTION OF REBALANCE LOGIC AND II) RE-ATTEMPT REQUESTED ALLOCATE RESOURCE UNIT OPERATION AFTER REBALANCE LOGIC COMPLETES

306 TRIGGER EXECUTION OF MONITOR LOGIC

Fig. 3

MONITOR FUNCTION FLOW 400

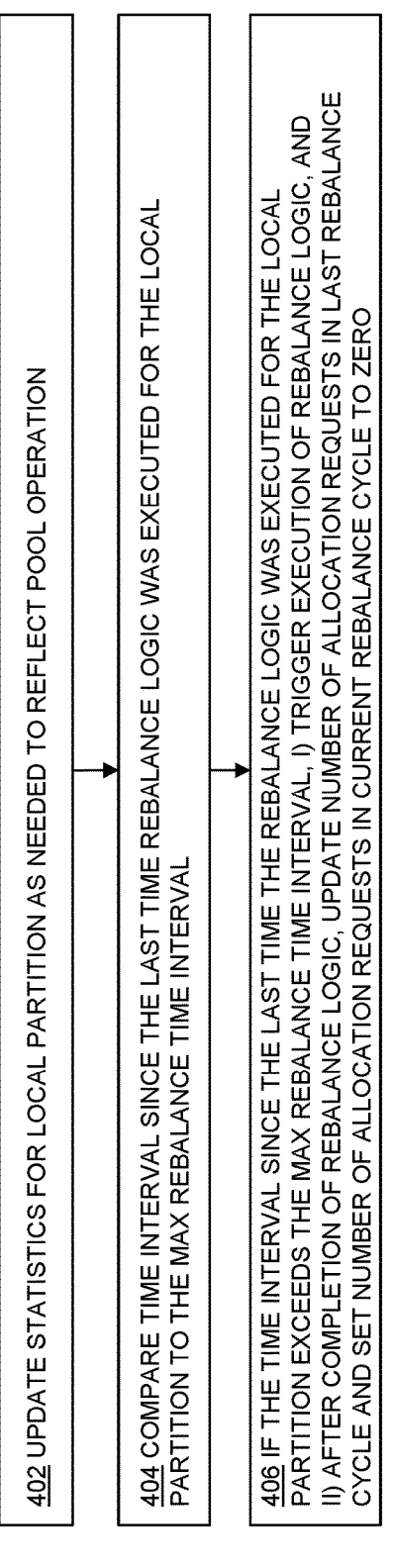

402 UPDATE STATISTICS FOR LOCAL PARTITION AS NEEDED TO REFLECT POOL OPERATION

404 COMPARE TIME INTERVAL SINCE THE LAST TIME REBALANCE LOGIC WAS EXECUTED FOR THE LOCAL PARTITION TO THE MAX REBALANCE TIME INTERVAL

406 IF THE TIME INTERVAL SINCE THE LAST TIME THE REBALANCE LOGIC WAS EXECUTED FOR THE LOCAL PARTITION EXCEEDS THE MAX REBALANCE TIME INTERVAL, I) TRIGGER EXECUTION OF REBALANCE LOGIC, AND II) AFTER COMPLETION OF REBALANCE LOGIC, UPDATE NUMBER OF ALLOCATION REQUESTS IN LAST REBALANCE CYCLE AND SET NUMBER OF ALLOCATION REQUESTS IN CURRENT REBALANCE CYCLE TO ZERO

Fig. 4

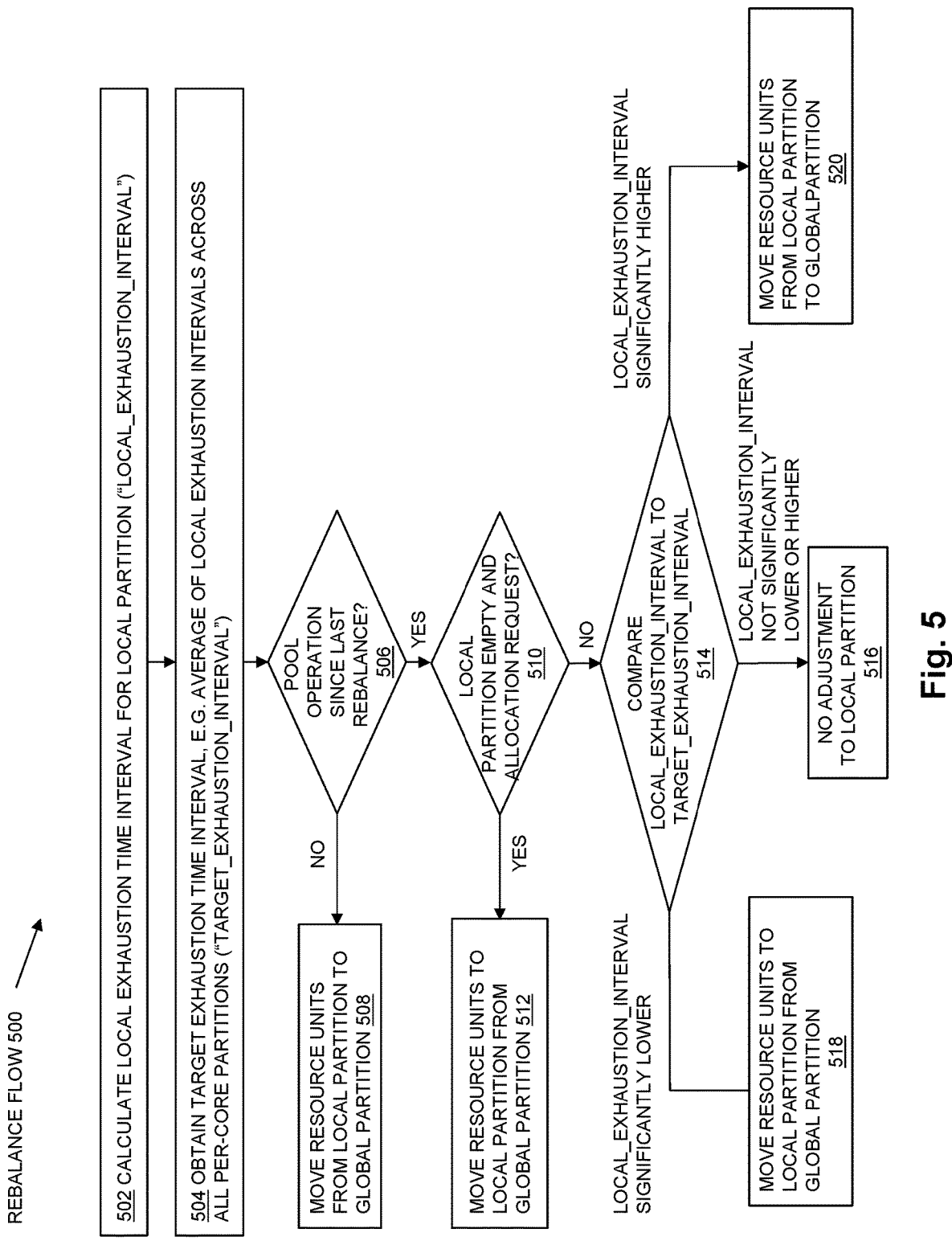

REBALANCE FLOW 500

502 CALCULATE LOCAL EXHAUSTION TIME INTERVAL FOR LOCAL PARTITION ("LOCAL_EXHAUSTION_INTERVAL")

504 OBTAIN TARGET EXHAUSTION TIME INTERVAL, E.G. AVERAGE OF LOCAL EXHAUSTION INTERVALS ACROSS ALL PER-CORE PARTITIONS ("TARGET_EXHAUSTION_INTERVAL")

POOL OPERATION SINCE LAST REBALANCE? 506

NO → MOVE RESOURCE UNITS FROM LOCAL PARTITION TO GLOBAL PARTITION 508

YES

LOCAL PARTITION EMPTY AND ALLOCATION REQUEST? 510

YES → MOVE RESOURCE UNITS TO LOCAL PARTITION FROM GLOBAL PARTITION 512

NO

COMPARE LOCAL_EXHAUSTION_INTERVAL TO TARGET_EXHAUSTION_INTERVAL 514

LOCAL_EXHAUSTION_INTERVAL SIGNIFICANTLY HIGHER → MOVE RESOURCE UNITS FROM LOCAL PARTITION TO GLOBAL PARTITION 520

LOCAL_EXHAUSTION_INTERVAL NOT SIGNIFICANTLY LOWER OR HIGHER → NO ADJUSTMENT TO LOCAL PARTITION 516

LOCAL_EXHAUSTION_INTERVAL SIGNIFICANTLY LOWER → MOVE RESOURCE UNITS TO LOCAL PARTITION FROM GLOBAL PARTITION 518

Fig. 5

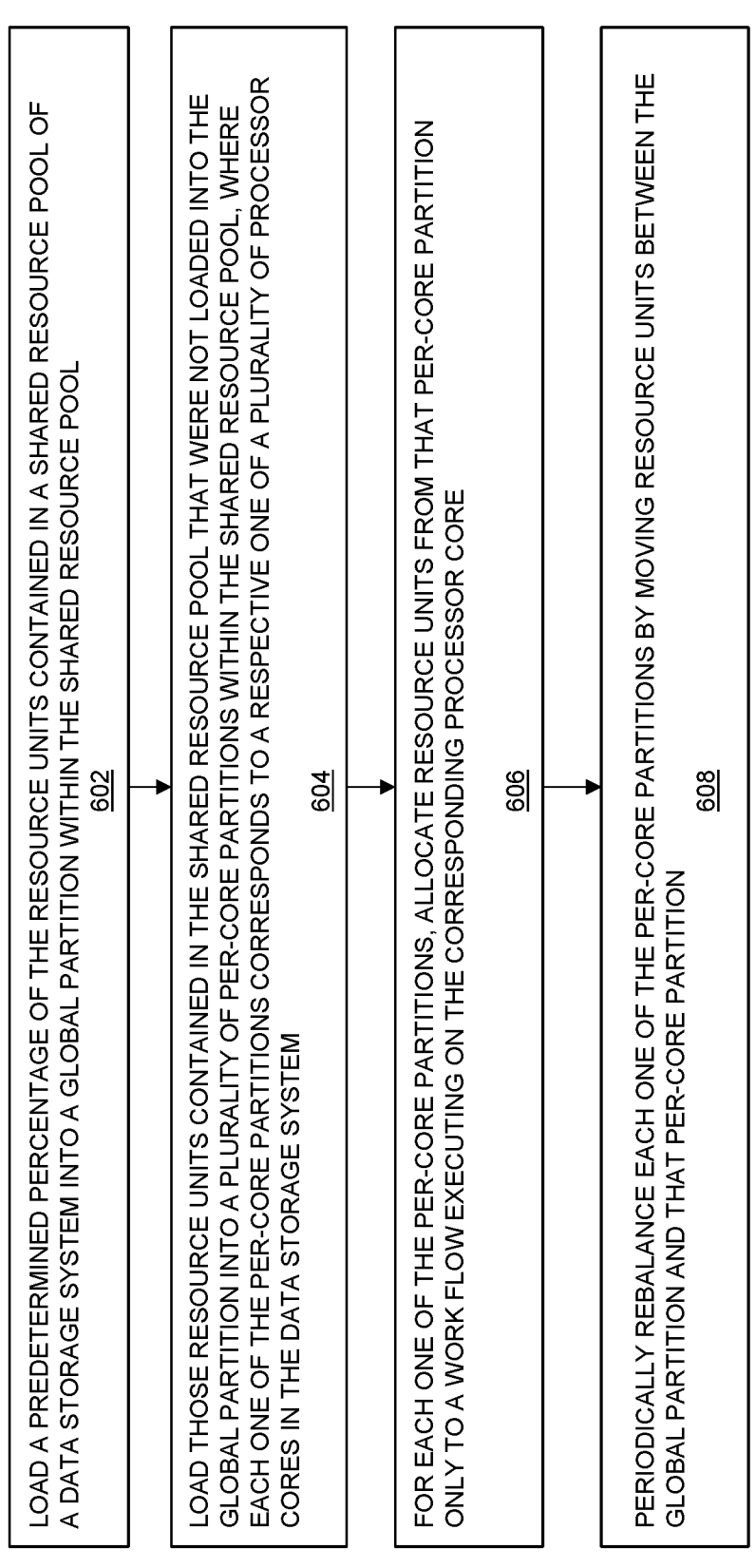

LOAD A PREDETERMINED PERCENTAGE OF THE RESOURCE UNITS CONTAINED IN A SHARED RESOURCE POOL OF A DATA STORAGE SYSTEM INTO A GLOBAL PARTITION WITHIN THE SHARED RESOURCE POOL
602

LOAD THOSE RESOURCE UNITS CONTAINED IN THE SHARED RESOURCE POOL THAT WERE NOT LOADED INTO THE GLOBAL PARTITION INTO A PLURALITY OF PER-CORE PARTITIONS WITHIN THE SHARED RESOURCE POOL, WHERE EACH ONE OF THE PER-CORE PARTITIONS CORRESPONDS TO A RESPECTIVE ONE OF A PLURALITY OF PROCESSOR CORES IN THE DATA STORAGE SYSTEM
604

FOR EACH ONE OF THE PER-CORE PARTITIONS, ALLOCATE RESOURCE UNITS FROM THAT PER-CORE PARTITION ONLY TO A WORK FLOW EXECUTING ON THE CORRESPONDING PROCESSOR CORE
606

PERIODICALLY REBALANCE EACH ONE OF THE PER-CORE PARTITIONS BY MOVING RESOURCE UNITS BETWEEN THE GLOBAL PARTITION AND THAT PER-CORE PARTITION
608

Fig. 6

SHARED RESOURCE POOL WITH PERIODIC REBALANCING IN A MULTI-CORE SYSTEM

TECHNICAL FIELD

The present disclosure relates generally to multi-core data storage systems.

BACKGROUND

Data storage systems are arrangements of hardware and software that are coupled to non-volatile data storage drives, such as solid state drives and/or magnetic disk drives. The data storage system services host I/O requests received from physical and/or virtual host machines ("hosts"). The host I/O requests received by the data storage system specify host data that is written and/or read by the hosts. The data storage system executes software that processes the host I/O requests by performing various data processing tasks to efficiently organize and persistently store the host data in the non-volatile data storage drives of the data storage system.

Applications and/or processes executing in a data storage system may share resources within the data storage system. Units of a shared resource are sometimes stored in a shared resource pool from which they may be allocated.

SUMMARY

In the disclosed technology a percentage of the resource units contained in a shared resource pool of a data storage system are loaded into a global partition within the shared resource pool. Those resource units contained in the shared resource pool that were not loaded into the global partition are loaded into per-core partitions within the shared resource pool. Each one of the per-core partitions corresponds to a respective one of multiple processor cores in the data storage system. For each one of the per-core partitions, resource units are allocated from that per-core partition only to a work flow executing on the corresponding processor core. Each one of the per-core partitions is periodically rebalanced independently by moving resource units between the global partition and that per-core partition.

In some embodiments, each of the per-core partitions is periodically rebalanced at least in part by calculating a local exhaustion time interval for the per-core partition. The local exhaustion interval is an estimated amount of time until all resource units currently available in the per-core partition are exhausted. A target exhaustion time interval is also obtained (i.e. calculated or retrieved). Resource units may then be moved from the global partition to the per-core partition in response to a determination that the local exhaustion time interval for the per-core partition is significantly smaller than the target exhaustion time interval.

In some embodiments, each of the per-core partitions may be periodically rebalanced at least in part by moving resource units from the per-core partition to the global partition in response to a determination that the local exhaustion time interval for the per-core partition is significantly larger than the target exhaustion time interval.

In some embodiments, each of the per-core partitions may be periodically rebalanced at least in part by moving resource units from the per-core partition to the global partition in response to a determination that no pool operation has been performed on the per-core partition since a last time that the per-core partition was rebalanced.

In some embodiments, each of the per-core partitions may be periodically rebalanced at least in part by moving resource units from the global partition to the per-core partition in response to a determination that the per-core partition is empty and an allocation request was issued by the work flow executing on the corresponding processor core.

In some embodiments, the target exhaustion time interval is obtained by calculating the target exhaustion time interval as an average of local exhaustion time intervals calculated for the plurality of per-core partitions.

In some embodiments, periodic rebalancing of at least one of the per-core partitions may be triggered at least in part by a determination, made by monitoring logic executed after processing of a pool operation on a per-core partition, that an amount of time since a last time that rebalancing was performed on the per-core partition exceeds a maximum rebalance time interval.

In some embodiments, periodic rebalancing of at least one of the per-core partitions may be triggered at least in part by a determination that a per-core partition currently contains insufficient available resource units to perform an allocation request issued by the workflow executing on the corresponding processor core.

In some embodiments, a heartbeat timer thread is executed on each one of the processor cores, and periodic rebalancing of at least one of the per-core partitions may be triggered by a per-core heartbeat timer thread determining that an amount of time since a last time that rebalancing was performed on the per-core partition corresponding to the processor core executing the per-core heartbeat timer exceeds a maximum rebalance time interval.

The disclosed technology is integral to providing a practical technical solution to the problem of efficiently sharing resources in a data storage system having multiple processor cores, while also rebalancing components of the pool to maintain system performance in a changing operational environment. By loading resource units into per-core partitions corresponding to individual processor cores, and allocating resource units from individual ones of the per-core partitions only to the work flows that are executing on the corresponding processor cores, the disclosed technology enables resource units to be allocated to work flows without using performance impacting lock mechanisms (e.g. spin-locks). In addition, the disclosed technology provides efficient re-balancing of the individual per-core partitions using the shared global partition, to dynamically change the amounts of resources units contained in the per-core partitions to adapt to changes in the types of work flows scheduled for execution on the individual processor cores, and/or to changes in the work load levels placed on individual processor cores, as may result from changing host I/O request patterns.

The foregoing summary does not indicate required elements, or otherwise limit the embodiments of the disclosed technology described herein. The technical features described herein can be combined in any specific manner, and all combinations may be used to embody the disclosed technology.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

FIG. 3 is a flow chart showing an example of steps performed during pool operation processing in some embodiments;

FIG. 4 is a flow chart showing an example of steps performed during shared resource pool monitoring in some embodiments;

FIG. 5 is a flow chart showing an example of steps performed during shared resource pool rebalancing in some embodiments; and FIG. 6 is a flow chart showing an example of steps performed in some embodiments.

DETAILED DESCRIPTION

Figure 1:
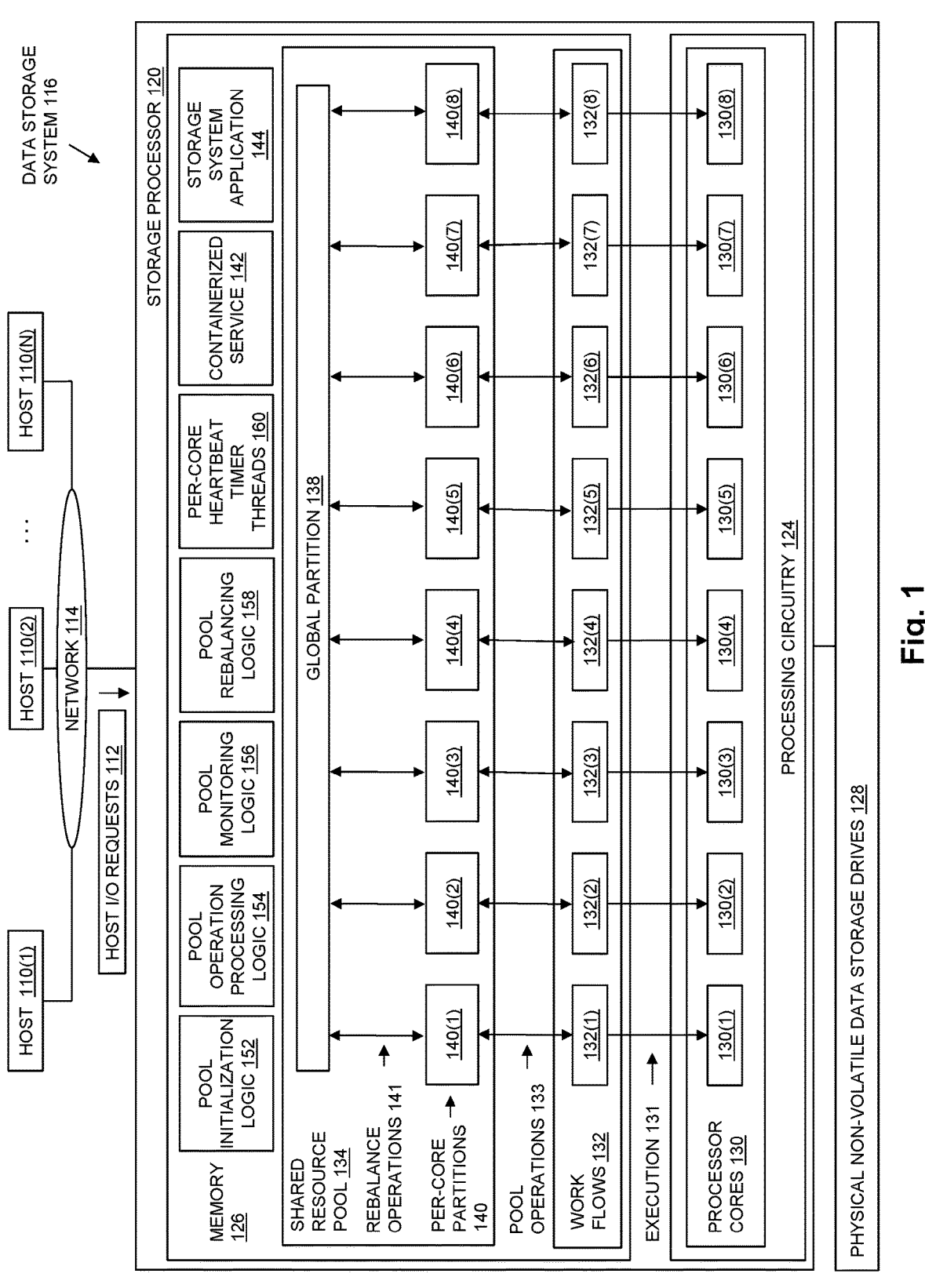
FIG. 1 is a block diagram showing an illustrative example of a data storage system including an embodiment of the disclosed technology.

Embodiments will now be described with reference to the figures. The embodiments described herein are not limiting, and are provided only as examples, in order to illustrate various features and principles of the disclosed technology. The embodiments of disclosed technology described herein are integrated into a practical solution for efficiently sharing resources in a data storage system having multiple processor cores, while also rebalancing components of the pool to maintain system performance in a changing operational environment.

In embodiments of the disclosed technology, a percentage of the resource units contained in a shared resource pool of a data storage system are loaded into a global partition within the shared resource pool. Those resource units contained in the shared resource pool that were not loaded into the global partition are loaded into per-core partitions within the shared resource pool. Each one of the per-core partitions corresponds to a respective one of multiple processor cores in the data storage system. For each one of the per-core partitions, resource units are allocated from that per-core partition only to a work flow executing on the corresponding processor core. Each one of the per-core partitions is periodically rebalanced by moving resource units between the global partition and that per-core partition.

Each of the per-core partitions may be periodically rebalanced at least in part by calculating a local exhaustion time interval for the per-core partition. The local exhaustion interval is an estimated amount of time until all resource units currently available in the per-core partition are exhausted. A target exhaustion time interval may also be obtained. Resource units are then moved from the global partition to the per-core partition in response to a determination that the local exhaustion time interval for the per-core partition is significantly smaller than the target exhaustion time interval.

Each of the per-core partitions may be periodically rebalanced at least in part by moving resource units from the per-core partition to the global partition in response to a determination that the local exhaustion time interval for the per-core partition is significantly larger than the target exhaustion time interval.

Each of the per-core partitions may be periodically rebalanced at least in part by moving resource units from the per-core partition to the global partition in response to a determination that no pool operation has been performed on the per-core partition since a last time that the per-core partition was rebalanced.

Each of the per-core partitions may be periodically rebalanced at least in part by moving resource units from the global partition to the per-core partition in response to a determination that the per-core partition is empty and an allocation request was issued by the work flow executing on the corresponding processor core.

The target exhaustion time interval may be obtained by calculating the target exhaustion time interval as an average of local exhaustion time intervals calculated for the plurality of per-core partitions.

Periodic rebalancing of at least one of the per-core partitions may be triggered at least in part by a determination, made by monitoring logic executed after processing of a pool operation on the per-core partition, that an amount of time since a last time that rebalancing was performed on the per-core partition exceeds a maximum rebalance time interval.

Periodic rebalancing of at least one of the per-core partitions may be triggered at least in part by a determination that the per-core partition currently contains insufficient available resource units to perform an allocation request issued by the workflow executing on the corresponding processor core.

A heartbeat timer thread may be executed on each one of the processor cores, and periodic rebalancing of at least one of the per-core partitions may be triggered at least in part by one of the per-core heartbeat timer threads determining that an amount of time since a last time that rebalancing was performed on the per-core partition corresponding to the processor core executing the per-core heartbeat timer exceeds a maximum rebalance time interval.

FIG. 1 is a block diagram showing an operational environment for the disclosed technology, including an example of a data storage system in which the disclosed technology is embodied. FIG. 1 shows a number of physical and/or virtual Host Computing Devices 110, referred to as "hosts", and shown for purposes of illustration by Hosts 110(1) through 110(N). The hosts and/or applications executing thereon may access non-volatile data storage provided by Data Storage System 116, for example over one or more networks, such as a local area network (LAN), and/or a wide area network (WAN) such as the Internet, etc., and shown for purposes of illustration in FIG. 1 by Network 114. Alternatively, or in addition, one or more of Hosts 110 and/or applications accessing non-volatile data storage provided by Data Storage System 116 may execute within Data Storage System 116.

Data Storage System 116 includes at least one Storage Processor 120 that is communicably coupled to both Network 114 and Physical Non-Volatile Data Storage Drives 128, e.g. at least in part though one or more communication interfaces of Storage Processor 120. No particular hardware configuration is required, and Storage Processor 120 may be embodied as any specific type of device that is capable of processing host input/output (I/O) requests (e.g. I/O read requests and I/O write requests, etc.), and of persistently storing host data.

The Physical Non-Volatile Data Storage Drives 128 may include physical data storage drives such as solid state drives, magnetic disk drives, hybrid drives, optical drives, and/or other specific types of drives.

A Memory 126 in Storage Processor 120 stores program code that is executed on Processing Circuitry 124, as well as data generated and/or processed by such program code.

Memory 126 may include volatile memory (e.g. RAM), and/or other types of memory.

Memory 126 may include and/or be communicably coupled with a cache contained within Storage Processor 120. The cache may be used to cache host data received by Storage Processor 120 from Hosts 110 (e.g. host data indicated in I/O write requests). Host data stored in the cache is flushed from time to time from the cache into Physical Non-Volatile Data Storage Drives 128.

Processing Circuitry 124 includes or consists of multiple Processor Cores 130, e.g. within one or more multi-core processor packages. In the example of FIG. 1, Processor Cores 130 includes processor cores 130(1), 130(2), 130(3), 130(4), 130(5), 130(6), 130(7), and 130(8). While the example of FIG. 1 shows eight processor cores, those skilled in the art will recognize that the disclosed technology may be embodied using any specific number of processor cores.

Each processor core in Processor Cores 130 includes or consists of a separate processing unit, sometimes referred to as a Central Processing Unit (CPU). Each individual processor core in Processor Cores 130 is made up of separate electronic circuitry that independently executes instructions, e.g. instructions within a corresponding work flow consisting of one or more threads scheduled for execution on that processor core.

Processing Circuitry 124 and Memory 126 together form control circuitry that is configured and arranged to carry out various methods and functions described herein. The Memory 126 stores a variety of software components that may be provided in the form of executable program code, including Pool Initialization Logic 152, Pool Operation Processing Logic 154, Pool Monitoring Logic 156, Pool Rebalancing Logic 158, Per-Core Heartbeat Timer Threads 160, Containerized Service 142, and Storage System Application 144. When the program code stored in Memory 126 is executed by Processing Circuitry 124, Processing Circuitry 124 is caused to carry out the operations of the software components described herein. Although certain software components are shown in the Figures and described herein for purposes of illustration and explanation, those skilled in the art will recognize that Memory 126 may also include various other specific types of software components.

In the illustrative example of FIG. 1, as indicated by Execution 131, each one of the processor cores in Processor Cores 130 independently executes a corresponding one of the work flows in Work Flows 132. Each one of the work flows in Work Flows 132 consists of one or more threads scheduled for execution on the corresponding processor core. For example, Work Flow 132(1) executes on Processor Core 130(1), Work Flow 132(2) executes on Processor Core 130(2), Work Flow 132(3) executes on Processor Core 130(3), Work Flow 132(4) executes on Processor Core 130(4), Work Flow 132(5) executes on Processor Core 130(5), Work Flow 132(6) executes on Processor Core 130(6), Work Flow 132(7) executes on Processor Core 130(7), and Work Flow 132(8) executes on Processor Core 130(8).

Each one of the Work Flows 132 includes one or more threads of Pool Initialization Logic 152, Pool Operation Processing Logic 154, Pool Monitoring Logic 156, Pool Rebalancing Logic 158, Per-Core Heartbeat Timer Threads 160, Containerized Service 142, and/or Storage System Application 155. Each work flow in Work Flows 132 may consist of a different set of threads, and the specific set of threads in each work flow in Work Flows 132 may be changed over time in response to changes in Host I/O Requests 112.

Processor Cores 130 may include a shared portion consisting of processor cores that are shared between Storage System Application 144 and Containerized Service 142, each of which may be used to execute threads of Storage System Application 144 and/or Containerized Service 142. Processor Cores 130 may also include a non-shared portion consisting of processor cores that are used exclusively to execute threads of Storage System Application 144.

In the example of FIG. 1, Storage System Application 144 is an application that provides a block-based (aka "block level") data storage service to one or more of the Hosts 110. The block-based data storage service provided by Storage System Application 144 processes block-based I/O requests received by Data Storage System 116 from Hosts 110. The block-based I/O requests processed by Storage System Application 144 enable the Hosts 110 to indicate blocks of host data that is written to and read from blocks of the non-volatile data storage (e.g. Physical Non-Volatile Data Storage Drives 128) that is served by Data Storage System 116. The block-based I/O requests processed by Storage System Application 144 are communicated to Data Storage System 116 by Hosts 110 using a block-based storage protocol that is supported by Storage System Application 144. In this way, Storage System Application 144 enables the Hosts 110 to connect to Data Storage System 116 using a block-based data storage protocol. Examples of block-based data storage protocols that may be supported by Storage System Application 144 in various embodiments include without limitation Fibre Channel (FC), Internet Small Computer Systems Interface (iSCSI), and/or Non-Volatile Memory Express (NVMe) protocols.

Execution of Storage System Application 144 includes execution of host I/O request processing threads that perform in-line processing of block-based host I/O requests received by Data Storage System 116. Such in-line processing may include all processing of each block-based host I/O write request that is necessary to perform before an acknowledgement is returned to the host indicating that the host data indicated by the I/O write request has been securely stored by Data Storage System 116. In-line processing of block-based host I/O write requests may include securely storing the host data indicated by the I/O write requests either into the cache and/or into Physical Non-Volatile Data Storage Drives 128. In the case of block-based I/O read requests, the in-line processing may include reading requested data from the cache or Physical Non-Volatile Data Storage Drives 128, and any additional data processing that may be necessary, such as decompression, decryption, etc., of the host data. Execution of Storage System Application 144 may further include execution of background task threads that perform background processing of host data that is not performed in-line, and which may be deferred. The background processing of host data may include processing of host data indicated by I/O write requests that can be performed after an acknowledgement is returned to the host indicating that the host data indicated by the host I/O write request has been securely stored in the Data Storage System 116, and/or flushing of host data from the cache to Physical Non-Volatile Data Storage Drives 128. Other examples of background processing of host data may include compression, deduplication, and/or encryption of host data stored in either the cache and/or Physical Non-Volatile Data Storage Drives 128.

Further in the example of FIG. 1, Containerized Service 142 is a containerized service installed in an operating system (e.g. Linux) that executes in Data Storage System 116. Containerized Service 142 may, for example, include file-based data storage service logic that provides a file-level data storage service, and that is packaged with its own software logic, libraries, and/or configuration files in a software container. For example, in some embodiments, Containerized Service 142 may be provided as a Docker container hosted in a Docker Engine, as developed by Docker, Inc.

Execution of Containerized Service 142 includes execution of threads that provide a file-based (aka "file-level") data storage service to one or more of the Hosts 110. The file-based data storage service provided by Containerized Service 142 processes file-based I/O requests received by Data Storage System 116 from Hosts 110. The file-based I/O requests received by Data Storage System 116 from Hosts 110 and processed by Containerized Service 142 access files that are served by Containerized Service 142 to the Hosts 110, and that are stored in the Physical Non-Volatile Data Storage Drives 128. In this way, execution of Containerized Service 142 includes execution of threads that provide file-level storage and acts as Network Attached Storage (NAS) for the Hosts 110. The file-based I/O requests processed by Containerized Service 142 are communicated to Data Storage System 116 by Hosts 110 using a file-based storage protocol that is supported by Containerized Service 142. Containerized Service 142 enables the Hosts 110 to connect to Data Storage System 116 using such a file-based storage protocol. Examples of file-based storage protocols that may be supported by Containerized Service 142 include without limitation Network File System (NFS) and/or Server Message Block (SMB) protocols.

Shared Resource Pool 134 contains resource units that are shared among the Work Flows 132. The resource units in Shared Resource Pool 134 may be any specific type of resource that can be allocated, used, and returned by the work flows in Work Flows 132.

For example, Shared Resource Pool 134 may be an object pool, containing resource units that are initialized object instances. Available object instances in Shared Resource Pool 134 can be quickly allocated when needed, used, and then returned by individual work flows in Work Flows 132.

In another example, Shared Resource Pool 134 may be a pool of remote direct memory access (RDMA) buffer addresses, in which the resource units are addresses of data buffers a remote storage processor that used to receive host data transferred from Storage Processor 120 through hardware assisted RDMA. Available RDMA buffer addresses in the Shared Resource Pool 134 accordingly represent remote data buffers that are available to store host data transferred using RDMA. When one or more available RDMA buffer addresses are allocated by a work flow, the corresponding remote data buffers are then used by the work flow to receive host data when the work flow performs one or more hardware assisted remote direct memory access (RDMA) operations transferring host data from the Storage Processor 120 to the remote storage processor. After the RDMA operations are completed, and the transferred host data successfully read or flushed from the remote buffers by the remote storage processor, the RDMA buffer addresses may be returned to Shared Resource Pool 134 for reallocation.

In another example, Shared Resource Pool 134 may be a pool of memory chunks and/or cache lines in Storage Processor 120 that can be allocated by a work flow. The allocated memory chunks and/or cache lines are used to temporarily store host data and/or metadata, and then returned to Shared Resource Pool 134 when they are no longer needed (e.g. after the host data and/or metadata has been flushed to Physical Non-Volatile Data Storage Drives 128).

Shared Resource Pool 134 is initially configured with a total number of resource units that is estimated to be sufficient to serve a maximum expected workload level of Host I/O Requests 112, plus some overprovisioning. Pool Initialization Logic 152 loads a pre-determined percentage (e.g. thirty percent) of all the resource units contained in Shared Resource Pool 134 into the Global Partition 138 of Shared Resource Pool 134. Pool Initialization Logic 152 then loads those resource units of Shared Resource Pool 134 that were not loaded into Global Partition 138 (e.g. the remaining seventy percent) into Per-Core Partitions 140. For example, an equal number of the resource units that were not loaded into Global Partition 138 is loaded into each one of Per-Core Partition 140(1), Per-Core Partition 140(2), Per-Core Partition 140(3), Per-Core Partition 140(4), Per-Core Partition 140(5), Per-Core Partition 140(6), Per-Core Partition 140(7), and Per-Core Partition 140(8).

As shown in FIG. 1, each one of the Per-Core Partitions 140 corresponds to a respective one of Processor Cores 130. Specifically, Per-Core Partition 140(1) corresponds to Processor Core 130(1), Per-Core Partition 140(2) corresponds to Processor Core 130(2), Per-Core Partition 140(3) corresponds to Processor Core 130(3), Per-Core Partition 140(4) corresponds to Processor Core 130(4), Per-Core Partition 140(5) corresponds to Processor Core 130(5), Per-Core Partition 140(6) corresponds to Processor Core 130(6), Per-Core Partition 140(7) corresponds to Processor Core 130(7), and Per-Core Partition 140(8) corresponds to Processor Core 130(8).

Pool Operation Processing Logic 154 processes Pool Operations 133 issued by the Work Flows 132. The Pool Operations 133 include allocate resource unit operations, and free resource unit operations issued by individual ones of the Work Flows 132.

Pool Operation Processing Logic 154 processes allocate resource unit operations requested by Work Flows 132 such that for each one of the Per-Core Partitions 140, resource units are allocated from that per-core partition only to the work flow executing on the corresponding processor core. Accordingly, resource units in Per-Core Partition 140(1) are only allocated to Work Flow 132(1) (e.g. in response to allocate resource unit operations requested by Work Flow 132(1)), resource units in Per-Core Partition 140(2) are only allocated to Work Flow 132(2) (e.g. in response to allocate resource unit operations requested by Work Flow 132(2)), resource units in Per-Core Partition 140(3) are only allocated to Work Flow 132(3) (e.g. in response to allocate resource unit operations requested by Work Flow 132(3)), resource units in Per-Core Partition 140(4) are only allocated to Work Flow 132(4) (e.g. in response to allocate resource unit operations requested by Work Flow 132(4)), resource units in Per-Core Partition 140(5) are only allocated to Work Flow 132(5) (e.g. in response to allocate resource unit operations requested by Work Flow 132(5)), resource units in Per-Core Partition 140(6) are only allocated to Work Flow 132(6) (e.g. in response to allocate resource unit operations requested by Work Flow 132(6)), resource units in Per-Core Partition 140(7) are only allocated to Work Flow 132(7) (e.g. in response to allocate resource unit operations requested by Work Flow 132(7)), and resource units in Per-Core Partition 140(8) are only allocated to Work Flow 132(8) (e.g. in response to allocate resource unit operations requested by Work Flow 132(8)). Resource units in Global Partition 138 are only used during rebalancing, and resource units are never allocated from Global Partition 138 directly to any of the Work Flows 132. Because resource units are allocated only from each individual per-core partition to the work flow executing on the corresponding processor core, no locking mechanism needs to be employed when processing the resource unit allocation requests issued from the individual work flows, thus improving performance.

When a work flow has finished using one or more resource units that were previously allocated, it returns the resource units to the per-core partition corresponding to the processor core on which it executes. Accordingly, when Work Flow 132(1) finishes using a resource unit that it previously allocated, it requests a free resource unit operation be performed by Pool Operation Processing Logic 154 that returns that resource unit to Per-Core Partition 140(1). Similarly, when Work Flow 132(2) finishes using a resource unit that it previously allocated, it requests a free resource operation be performed by Pool Operation Processing Logic 154 returning that resource unit to Per-Core Partition 140(2), and so on for each of the work flows.

Because the specific set of threads in each work flow in Work Flows 132 may change over time in response to changes in Host I/O Requests 112, the resource unit requirements of each work flow may also change. Accordingly, the disclosed technology provides for periodic rebalancing of the numbers of resource units contained in each of the individual per-core partitions in Per-Core Partitions 140. Specifically, as indicated for purposes of illustration in FIG. 1 by Rebalancing Operations 141, Rebalancing Logic 158 periodically rebalances each one of the Per-Core Partitions 140 independently by moving resource units between that per-core partition and Global Partition 138. Accordingly, Rebalancing Logic 158 periodically rebalances Per-Core Partition 140(1) by moving resource units between Per-Core Partition 140(1) and Global Partition 138. Similarly, Rebalancing Logic 158 periodically rebalances Per-Core Partition 140(2) by moving resource units between Per-Core Partition 140(2) and Global Partition 138, and so on for each of the per-core partitions in Per-Core Partitions 140. Moving resource units to and/or from the shared Global Partition 138 during rebalancing may include acquisition of a spinlock or the like by Rebalancing Logic 158 to ensure synchronization of access to Global Partition 138 across the multiple work flows during rebalancing.

Each one of the per-core partitions in Per-Core Partitions 140 may be periodically rebalanced at least in part by Rebalancing Logic 158 calculating a local exhaustion time interval for the per-core partition. The local exhaustion interval is calculated as an estimated amount of time that will elapse before all resource units currently available in the per-core partition are exhausted, based on an allocation rate at which resource units were previously allocated from the per-core partition by the work flow executing on the corresponding processor core, and assuming that no resource units are returned by that work flow. For example, for Per-Core Partition 140(1), Rebalancing Logic 158 calculates a local exhaustion time interval equal to an estimated amount of time that would elapse until all resource units currently available in Per-Core Partition 140(1) are exhausted by resource unit allocation requests issued by Work Flow 132(1), causing Per-Core Partition 140(1) to become empty, based on an allocation rate at which resource units were previously allocated from Per-Core Partition 140(1) by Work Flow 132(1), and assuming that no allocated resource units are returned by Work Flow 132(1) to Per-Core Partition 140(1) during the local exhaustion time interval.

Also during rebalancing of each of the per-core partitions in Per-Core Partitions 140, Rebalancing Logic 158 obtains a target exhaustion time interval. The target exhaustion time interval may be obtained by Rebalancing Logic 158 calculating the target exhaustion time interval as an average of all the local exhaustion time intervals calculated for the individual the per-core partitions in Per-Core Partitions 140. Alternatively, the target exhaustion time interval may be obtained by retrieving a recently calculated target exhaustion time interval, e.g. that was previously calculated and stored globally during the rebalancing of another one of the per-core partitions.

After obtaining the target exhaustion time interval, Rebalancing Logic 158 proceeds with rebalancing the per-core partition by comparing the local exhaustion time interval calculated for that per-core partition to the target exhaustion time interval, and determining whether the local time interval for the per-core partition is significantly smaller than the target exhaustion time interval. In response to a determination that the local exhaustion time interval for a per-core partition is significantly smaller than the target exhaustion time interval, Rebalancing Logic 158 moves one or more resource units from Global Partition 138 to the per-core partition. For example, in response to a determination that the local exhaustion time interval calculated for Per-Core Partition 140(1) is significantly smaller than the target exhaustion time interval, Rebalancing Logic 158 moves one or more resource units from Global Partition 138 to Per-Core Partition 140(1).

Rebalancing Logic 158 may also rebalance an individual per-core partition at least in part by moving resource units from the per-core partition to the Global Partition 138 in response to a determination that the local exhaustion time interval for a per-core partition is significantly larger than the target exhaustion time interval. For example, in response to a determination that the local exhaustion time interval calculated for Per-Core Partition 140(2) is significantly larger than the target exhaustion time interval, Rebalancing Logic 158 moves one or more resource units from Per-Core Partition 140(2) to Global Partition 138.

Rebalancing Logic 158 may also periodically rebalance a per-core partition at least in part by moving one or more resource units from the per-core partition to Global Partition 138 in response to determining that no pool operation has been performed on a per-core partition since a last time that the per-core partition was rebalanced. For example, Rebalancing Logic 158 may rebalance Per-Core Partition 140(3) by moving one or more resource units from Per-Core Partition 140(3) to Global Partition 138 in response to determining that no pool operation has been performed on Per-Core Partition 140(3) (i.e. no resource unit allocation request or return operation was issued by Work Flow 132(3)) since a last time that Per-Core Partition 140(3) was rebalanced.

Rebalancing Logic 158 may also periodically rebalance the individual per-core partitions at least in part by moving one or more resource units from Global Partition 138 to at least one per-core partition in response to Pool Operation Processing Logic 154 determining that the per-core partition is empty and an allocation request has been issued by the work flow executing on the corresponding processor core. For example, Rebalancing Logic 158 may periodically rebalance Per-Core Partition 140(4) at least in part by moving one or more resource units from Global Partition 138 Per-Core Partition 140(4) in response to Pool Operation Processing Logic 154 determining that Per-Core Partition 140(4) is currently empty and a resource unit allocation request has been issued by Work Flow 132(4).

Periodic rebalancing of individual ones of the per-core partitions in Per-Core Partitions 140 by Pool Rebalancing Logic 158 may be triggered by Pool Monitoring Logic 156, which is executed by Pool Operation Processing Logic 154 after processing of each pool operation. Pool Monitoring Logic 156 may determine that an amount of time that has expired since a last time that rebalancing was performed on a per-core partition on which a pool operation was performed exceeds a maximum rebalance time interval. Pool Monitoring Logic 156 may, for example, trigger periodic rebalancing of Per-Core Partition 140(5) by Pool Rebalancing Logic 158 when Pool Monitoring Logic 156 determines that an amount of time that has expired since a last time that rebalancing was performed on Per-Core Partition 140(5) exceeds a pre-determined maximum rebalance time interval.

Periodic rebalancing of individual ones of the per-core partitions in Per-Core Partitions 140 by Pool Rebalancing Logic 158 may also be triggered by Pool Operation Processing Logic 154 when Pool Operation Processing Logic 154 determines that a per-core partition currently contains insufficient available resource units to perform an allocation request issued by the workflow executing on the corresponding processor core. For example, Pool Operation Processing Logic 154 may trigger periodic rebalancing of Per-Core Partition 140(6) by Pool Rebalancing Logic 158 in response to Pool Operation Processing Logic 154 determining that Per-Core Partition 140(6) currently contains insufficient available resource units to perform an allocation request issued by Work Flow 132(1).

A heartbeat timer thread may be executed on each one of the processor cores in Processor Cores 130. For example, for each one of the processor cores in Processor Cores 130, Per-Core Heartbeat Timer Threads 160 may include at least one heartbeat timer thread that executes on that processor core. The heartbeat time thread executing on a processor core may be executed periodically, and, each time it executes, check whether the amount of time since the last time that rebalancing was performed on the per-core partition corresponding to that processor core exceeds the maximum rebalance time interval. In response to determining that the amount of time since the last time that rebalancing was performed on the per-core partition corresponding to the processor core exceeds the maximum rebalance time interval, the heartbeat time thread triggers periodic rebalancing of the per-core partition by Pool Rebalancing Logic 158. For example, in response to determining that the amount of time since the last time that rebalancing was performed on Per-Core Partition 140(7) exceeds the maximum rebalance time interval, the heartbeat timer thread executing on Processor Core 130(7) triggers Pool Rebalancing Logic 158 to perform periodic rebalancing of Per-Core Partition 140(7).

Figure 2:
FIG. 2 is a flow chart showing an example of steps performed during initialization of the disclosed shared resource pool in some embodiments.

FIG. 2 is a flow chart showing an example of steps performed during an Initialization Flow 200 performed by Pool Initialization Logic 152 to initialize Shared Resource Pool 134.

At step 202, a total pool size is calculated. The total pool size is calculated to provide a sufficient number of resource units to serve an expected workload for the data storage system. The total pool size may further be calculated to include some amount of overprovisioning.

At step 204, the global partition within the shared resource pool is loaded with a number of resource units equal to some initial percentage of the total pool size. For example, the global partition may be initially loaded with thirty percent of the total number of resource units in the shared pool.

At step 206, the remaining resource units that were not loaded into the global partition are loaded into the per-core partitions of the shared resource pool. For example, each one of the per-core partitions in the shared resource pool may be loaded with an equal number of the remaining seventy percent of the resource units.

FIG. 3 is a flow chart showing an example of steps performed during a Pool Operation Processing Flow 300 performed by execution of Pool Operation Processing Logic 154. The steps of FIG. 3 may be performed by Pool Operation Processing Logic 154 while processing each pool operation requested by the Work Flows 132. Pool operations may include i) allocate resource unit operations that request allocation of one or more available resource units from the local partition, and ii) free resource unit operations that return one or more previously allocated resource units to the local partition.

At step 302, the pool operation is performed using only the per-core partition corresponding to the processor core that is executing the work flow that issued the pool operation. The per-core partition per-core partition corresponding to the processor core that is executing the work flow that issued the pool operation is referred to herein as the "local partition" for purposes of explanation. For example, a pool operation issued by Work Flow 132(1) is processed using only the local partition consisting of Per-Core Partition 140(1). In the case of an allocate resource unit operation requested by Work Flow 132(1), the operation is processed using only available resource units contained in Per-Core Partition 140(1). Similarly, in the case of a free resource unit operation requested by Work Flow 132(1), the operation is processed by returning one or more resource units that were previously allocated by Work Flow 132(1) to Per-Core Partition 140(1).

At step 304, a determination may be made in some cases that the current size of the local partition (i.e. the total number of available resource units in the local partition) is insufficient to perform the requested allocate resource unit operation. For example, in a case where the local partition contains only two available resource units, and the allocate resource unit operation requests allocation of ten resource units, then the current size of the local partition is insufficient to perform the requested operation. In response to the determination that the size of the local partition is insufficient to perform the requested allocate resource operation, Pool Rebalancing Logic 158 is executed on the processor core executing the work flow that requested the allocate resource unit operation, in order to rebalance the local partition. After rebalancing of the local partition has completed, the requested allocate resource unit operation is re-attempted.

At step 306, execution of Pool Monitoring Logic 156 is triggered. Execution of Pool Monitoring Logic 156 is triggered for each requested pool operation.

FIG. 4 is a flow chart showing an example of steps in a Monitor Function Flow 400 performed during execution of Pool Monitoring Logic 156.

At step 402, one or more of the statistics for the local partition are updated as needed to reflect the pool operation (e.g. to reflect the pool operation that was performed at step 302 of FIG. 3).

The disclosed technology (e.g. Pool Operation Processing Logic 154, Pool Monitoring Logic 156, Pool Rebalancing Logic 158, and/or the Per-Core Heartbeat Timer Threads 16) maintains, for each one of the per-core partitions, at least the following statistics:

i) Number of resource units currently available for allocation in the per-core partition ("Resource_Units_Available"), ii) Number of resource units currently allocated from the per-core partition ("Resource_Units_Currently_Allocated"), iii) Time that the last pool operation was performed on the per-core partition (a timestamp-"Last_Pool_Operation_ Time"), iv) Time that rebalancing was last performed on the per-core partition (a timestamp-"Last_Rebalance_ Time"), v) Number of resource units that were allocated from the per-core partition during a current rebalance cycle, i.e. since the last time that rebalancing was performed on the per-core partition ("Allocated_During_Current_ Cycle"), vi) Number of resource units that were allocated from the per-core partition during the last rebalance cycle, i.e. between the time that rebalancing was last performed on the per-core partition and the time that rebalancing was performed on the per-core partition before that ("Allocated_During_Last_Cycle").

Those of the above statistics that need to be updated to reflect the pool operation that was performed at step 302 are updated at step 402.

At step 404, the time interval since the last time the local partition was rebalanced (the amount of time between "Last_Rebalance_Time" and the current time) is compared to a maximum rebalance time interval. The maximum rebalance time interval may, for example, be a predetermined value between 0.5 and 1 second.

At step 406, if the time interval since the last time the local partition was rebalanced exceeds the maximum rebalance time interval, rebalancing of the local partition is triggered by execution of Pool Rebalancing Logic 158. After the rebalancing of the local partition is completed, the value of Allocated_During_Current_Cycle is copied to Allocated_During_Last_Cycle, and then Allocated_During_Current_Cycle is reset to zero.

FIG. 5 is a flow chart showing an example of steps in a Rebalance Flow 500 performed during execution of Pool Rebalancing Logic 158.

At step 502, a local exhaustion time interval ("Local_Exhaustion_Interval") is calculated for the local partition. The number of resource units that were allocated from the local partition during the current rebalance cycle ("Allocated_During_Current_Cycle") and the amount of time since the last time that rebalancing was performed on the local partition (time since "Last_Rebalance_Time") may be used to calculate an allocation rate for the per-core partition ("Allocation_Rate"):

$$\text{Allocation\_Rate} = \text{Allocated\_During\_Current\_Cycle}/\text{time since Last\_Rebalance\_Time}$$

In some embodiments, a difference between Allocated_During_Current_Cycle and Allocated_During_Last_Cycle is calculated. In response to the difference between Allocated_During_Current_Cycle and Allocated_During_Last_Cycle being less than a pre-determined difference threshold, the allocation rate for the local partition is considered relatively stable, and Pool Rebalancing Logic 158 rebalances the local partition only once per each pre-determined number of times that Pool Rebalancing Logic 158 is consecutively executed for the local partition while the difference between Allocated_During_Current_Cycle and Allocated_During_Last_Cycle remains less than the predetermined difference threshold, e.g. only once per every four times that Pool Rebalancing Logic 158 is executed for the local partition while the difference between Allocated_During_Current_Cycle and Allocated_During_Last_Cycle remains less than the pre-determined difference threshold.

Allocation_Rate and the current value of Resource_Units_Available for the local partition may be used at step 502 to calculate the local exhaustion interval ("Local_Exhaustion_Interval") for the local partition, i.e. the estimated amount of time that will elapse before all resource units currently available in the local partition are exhausted, causing the local partition to become empty:

$$\text{Local\_Exhaustion\_Interval} = \text{Allocation\_Rate} * \text{Resource\_Units\_Available}$$

At step 504, the target exhaustion time interval ("Target_Exhaustion_Interval") is obtained, e.g. by calculating an average of local exhaustion intervals calculated for all of the per-core partitions. While calculation of Target_Exhaustion_Interval may require accessing the statistics of other per-core partitions, exact precision is not required. Accordingly, atomicity need not be enforced while performing this calculation, and the performance impact is small.

In some embodiments, each time Target_Exhaustion_Interval is calculated it is stored globally together with a time stamp indicating the time that it was calculated. In such embodiments, at step 504 Pool Rebalancing Logic 158 may check to see whether Target_Exhaustion_Interval was previously calculated and stored globally. If Target_Exhaustion_Interval was previously calculated and stored, Pool Rebalancing Logic 158 compares the time since Target_Exhaustion_Interval was last calculated to a predetermined time interval. If the time since Target_Exhaustion_Interval was last calculated does not exceed the predetermined time interval, Pool Rebalancing Logic 158 obtains Target_Exhaustion_Interval simply by retrieving the globally stored Target_Exhaustion_Interval, without having to re-calculate it. In this way, a value of Target_Exhaustion_Interval calculated while rebalancing one per-core partition may be re-used when rebalancing another one of the per-core partitions. If the time since Target_Exhaustion_Interval was last calculated exceeds the predetermined time interval, Pool Rebalancing Logic 158 re-calculates Target_Exhaustion_Interval, stores the new value globally, and updates the time stamp.

At step 506, Pool Rebalancing Logic 158 determines whether any pool operation has been performed on the local partition since the last time at which the local partition was rebalanced. Such a determination may be made by comparing the current values of Last_Pool_Operation_Time and Last_Rebalance_Time for the local partition. In the case where no pool operation has been performed on the local partition since the last time at which the local partition was rebalanced, the work flow executing on the processor core corresponding to the local partition has apparently stopped using the resource units in the shared pool. Such a change in resource unit consumption may occur when the type of threads being executed in the work flow changes.

In response to determining that no pool operation has been performed on the local partition since the last time the local partition was rebalanced, step 506 is followed by step 508. At step 508, a number of resource units are moved from the local partition to Global Partition 138. The specific number of resource units moved from the local partition to Global Partition 138 is selected to allow a small number of resource units to remain available in the local partition, in case the work flow executing on the processor core corresponding to the local partition has actually not stopped using the resource units in the shared pool, and a flag is set. If Pool Rebalancing Logic 158 is subsequently invoked to rebalance the local partition again, and again finds that no pool operation has been performed on the local partition since the last time the local partition was rebalanced, and also finds that the flag was previously set, Pool Rebalancing Logic 158 moves all remaining available resource units from the local partition to the Global Partition 138.

In the case where at least one pool operation has been performed on the local partition since the last time the local partition was rebalanced, step 506 is followed by step 510. In step 510, Pool Rebalancing Logic 158 determines whether the local partition is empty, and whether the requested pool operation is an allocate resource unit operation. In the case where the local partition is empty and the requested pool operation is an allocate resource unit request, the work flow corresponding to the local partition has resumed using the resource units in the shared pool, and step 510 is followed by step 512. In step 512, resource units are moved from Global Partition 138 to the local partition. The number of resource units moved to the local partition may be relatively large, e.g. larger than the number of resource units moved to the local partition in step 518 of FIG. 5. Otherwise, in the case where either the local partition is not empty or the requested pool operation is not an allocate resource unit operation, step 510 is followed by step 514.

In step 514, Local_Exhaustion_Interval is compared to Target_Exhaustion_Interval. In the case where Local_Exhaustion_Interval is significantly higher than Target_Exhaustion_Interval (e.g. Local_Exhaustion_Interval is more than a predetermined threshold amount higher than Target_Exhaustion_Interval), step 514 is followed by step 520. In the case where Local_Exhaustion_Interval is significantly lower than Target_Exhaustion_Interval (e.g. Target_Exhaustion_Interval is more than a predetermined threshold amount higher than Local_Exhaustion_Interval), step 514 is followed by step 518. In the case where Local_Exhaustion_Interval is not significantly higher or significantly lower than Target_Exhaustion_Interval, step 514 is followed by step 516.

At step 520, the local partition is determined to be overprovisioned, and accordingly some predetermined number of resource units (e.g. one or more resource units) are moved from the local partition to the Global Partition 138. If resource units cannot be moved from the local partition to the Global Partition 138 immediately, a flag may be set in the metadata for the local partition, causing resource units to be moved from the local partition to the Global Partition 138 the next time rebalancing is performed on the local partition, or when resource units are freed by the corresponding work flow.

At step 518, the local partition is determined to be under-provisioned, and accordingly some predetermined number of resource units (e.g. one or more resource units) are moved from Global Partition 138 to the local partition. If resource units cannot be moved from the Global Partition 138 immediately, a flag may be set in the metadata for the local partition, causing resource units to be moved to the local partition from the Global Partition 138 the next time rebalancing is performed on the local partition.

At step 516, the local partition is determined to not need to be rebalanced, and accordingly no adjustment is made with regard to the resource units contained in the local partition.

After the steps shown in FIG. 5 are completed for the local partition, Last_Rebalance_Time for the local partition is set to the current time.

FIG. 6 is a flow chart showing an example of steps performed in some embodiments.

At step 602, a predetermined percentage of the resource units contained in a shared resource pool of a data storage system are loaded into a global partition within the shared resource pool.

At step 604, those resource units contained in the shared resource pool that were not loaded into the global partition are loaded into a plurality of per-core partitions within the shared resource pool, where each one of the per-core partitions corresponds to a respective one of a plurality of processor cores in the data storage system.

At step 606, for each one of the per-core partitions, resource units are allocated from that per-core partition only to a work flow executing on the corresponding processor core.

At step 608, each one of the per-core partitions is periodically rebalanced by moving resource units between the global partition and that per-core partition.

As will be appreciated by those skilled in the art, aspects of the technology disclosed herein may be embodied as a system, method, or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:

loading a predetermined percentage of a plurality of resource units contained in a shared resource pool of a data storage system into a global partition within the shared resource pool;

loading those resource units contained in the shared resource pool that were not loaded into the global partition into a plurality of per-core partitions within the shared resource pool, wherein each one of the per-core partitions corresponds to a respective one of a plurality of processor cores in the data storage system;

for each one of the per-core partitions, allocating resource units from that per-core partition only to a work flow executing on the corresponding processor core;

periodically rebalancing each one of the per-core partitions by moving resource units between the global partition and the per-core partition, wherein the rebalancing includes:

calculating a local exhaustion time interval for the per-core partition, wherein the local exhaustion interval comprises an estimated amount of time until all resource units currently available in the per-core partition are exhausted, obtaining a target exhaustion time interval, and moving resource units from the global partition to the per-core partition in response to a determination that the local exhaustion time interval for the per-core partition is smaller than the target exhaustion time interval; and wherein periodically rebalancing at least one of the per-core partitions is triggered by a determination that an amount of time since a last time that rebalancing was performed on the per-core partition exceeds a maximum rebalance time interval.

2. The method of claim 1, wherein periodically rebalancing each one of the per-core partitions further comprises:

moving resource units from the per-core partition to the global partition in response to a determination that the local exhaustion time interval for the per-core partition is larger than the target exhaustion time interval.

3. The method of claim 2, wherein periodically rebalancing each one of the per-core partitions further comprises:

moving resource units from the per-core partition to the global partition in response to a determination that no pool operation has been performed on the per-core partition since a last time that the per-core partition was rebalanced.

4. The method of claim 3, wherein periodically rebalancing each one of the per-core partitions further comprises:

moving resource units from the global partition to the per-core partition in response to a determination that the per-core partition is empty and an allocation request was issued by the work flow executing on the corresponding processor core.

5. The method of claim 1, wherein obtaining the target exhaustion time interval comprises calculating the target exhaustion time interval as an average of local exhaustion time intervals calculated for the plurality of per-core partitions.

6. The method of claim 1, wherein periodically rebalancing at least one of the per-core partitions is triggered by a determination made by monitoring logic executed after processing a pool operation on a per-core partition that an amount of time since a last time that rebalancing was performed on the per-core partition exceeds the maximum rebalance time interval.

7. The method of claim 1, wherein periodically rebalancing at least one of the per-core partitions is triggered by a determination that a per-core partition currently contains insufficient available resource units to perform an allocation request issued by the workflow executing on the corresponding processor core.

8. The method of claim 1, further comprising:

executing a plurality of per-core heartbeat timer threads, wherein each one of the per-core heartbeat timer threads executes on a corresponding respective one of the processor cores; and wherein periodically rebalancing at least one of the per-core partitions is triggered by one of the per-core heartbeat timer threads determining that an amount of time since a last time that rebalancing was performed on the per-core partition corresponding to the processor core executing the per-core heartbeat timer exceeds the maximum rebalance time interval.

9. A data storage system comprising:

processing circuitry and a memory;

a plurality of non-volatile data storage drives; and wherein the memory has program code stored thereon, wherein the program code, when executed by the processing circuitry, causes the processing circuitry to:

load a predetermined percentage of a plurality of resource units contained in a shared resource pool of a data storage system into a global partition within the shared resource pool;

load those resource units contained in the shared resource pool that were not loaded into the global partition into a plurality of per-core partitions within the shared resource pool, wherein each one of the per-core partitions corresponds to a respective one of a plurality of processor cores in the data storage system;

for each one of the per-core partitions, allocate resource units from that per-core partition only to a work flow executing on the corresponding processor core; and periodically rebalance each one of the per-core partitions by moving resource units between the global partition and the per-core partition, at least in part by causing the processing circuitry to:

calculate a local exhaustion time interval for the per-core partition, wherein the local exhaustion interval comprises an estimated amount of time until all resource units currently available in the per-core partition are exhausted;

obtain a target exhaustion time interval, and move resource units from the global partition to the per-core partition in response to a determination that the local exhaustion time interval for the per-core partition is smaller than the target exhaustion time interval; and wherein the processing circuitry is triggered to periodically rebalance at least one of the per-core partitions by a determination that an amount of time since a last time that rebalancing was performed on the per-core partition exceeds a maximum rebalance time interval.

10. The data storage system of claim 9, wherein the program code, when executed by the processing circuitry, further causes the processing circuitry to periodically rebalance each one of the per-core partitions at least in part by causing the processing circuitry to:

move resource units from the per-core partition to the global partition in response to a determination that the local exhaustion time interval for the per-core partition is larger than the target exhaustion time interval.

11. The data storage system of claim 10, wherein the program code, when executed by the processing circuitry, further causes the processing circuitry to periodically rebalance each one of the per-core partitions at least in part by causing the processing circuitry to:

move resource units from the per-core partition to the global partition in response to a determination that no pool operation has been performed on the per-core partition since a last time that the per-core partition was rebalanced.

12. The data storage system of claim 11, wherein the program code, when executed by the processing circuitry, further causes the processing circuitry to periodically rebalance each one of the per-core partitions at least in part by causing the processing circuitry to:

move resource units from the global partition to the per-core partition in response to a determination that the per-core partition is empty and an allocation request was issued by the work flow executing on the corresponding processor core.

13. The data storage system of claim 9, wherein the target exhaustion time interval is obtained by calculating the target exhaustion time interval as an average of local exhaustion time intervals calculated for the plurality of per-core partitions.

14. The data storage system of claim 9, wherein the program code, when executed by the processing circuitry, further causes the processing circuitry to trigger periodic rebalancing of at least one of the per-core partitions at least in part in response to a determination made by monitoring logic executed after processing a pool operation on the per-core partition that an amount of time since a last time that rebalancing was performed on the per-core partition exceeds the maximum rebalance time interval.

15. The data storage system of claim 9, wherein the program code, when executed by the processing circuitry, further causes the processing circuitry to trigger periodic rebalancing of at least one of the per-core partitions in response to a determination that the per-core partition currently contains insufficient available resource units to perform an allocation request issued by the workflow executing on the corresponding processor core.

16. The data storage system of claim 9, wherein the program code, when executed by the processing circuitry, further causes the processing circuitry to:

execute a plurality of per-core heartbeat timer threads, wherein each one of the per-core heartbeat timer threads executes on a respective one of the processor cores; and trigger at least one of the per-core partitions to be periodically rebalanced when the heartbeat timer thread executing on the processor core corresponding to the per-core partition determines that an amount of time since a last time that rebalancing was performed on the per-core partition exceeds the maximum rebalance time interval.

17. A computer program product including a non-transitory computer readable medium having instructions stored thereon, wherein the instructions, when executed on processing circuitry, cause the processing circuitry to perform steps including:

loading a predetermined percentage of a plurality of resource units contained in a shared resource pool of a data storage system into a global partition within the shared resource pool;

loading those resource units contained in the shared resource pool that were not loaded into the global partition into a plurality of per-core partitions within the shared resource pool, wherein each one of the per-core partitions corresponds to a respective one of a plurality of processor cores in the data storage system;

for each one of the per-core partitions, allocating resource units from that per-core partition only to a work flow executing on the corresponding processor core;

periodically rebalancing each one of the per-core partitions by moving resource units between the global partition and the per-core partition, wherein the rebalancing includes:

calculating a local exhaustion time interval for the per-core partition, wherein the local exhaustion interval comprises an estimated amount of time until all resource units currently available in the per-core partition are exhausted, obtaining a target exhaustion time interval, and moving resource units from the global partition to the per-core partition in response to a determination that the local exhaustion time interval for the per-core partition is smaller than the target exhaustion time interval; and wherein periodically rebalancing at least one of the per-core partitions is triggered by a determination that an amount of time since a last time that rebalancing was performed on the per-core partition exceeds a maximum rebalance time interval.

*   *   *   *   *